United States Patent
Kawasaki et al.

(10) Patent No.: US 9,533,378 B2
(45) Date of Patent: Jan. 3, 2017

(54) LASER WELDING METHOD AND ENGINE COOLING STRUCTURE

(71) Applicants: Minoru Kawasaki, Toyota (JP); Kazuhito Sakai, Mishima (JP); Shintaro Utsumi, Susono (JP)

(72) Inventors: Minoru Kawasaki, Toyota (JP); Kazuhito Sakai, Mishima (JP); Shintaro Utsumi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 187 days.

(21) Appl. No.: 14/383,791

(22) PCT Filed: Mar. 4, 2013

(86) PCT No.: PCT/IB2013/000416
§ 371 (c)(1),
(2) Date: Sep. 8, 2014

(87) PCT Pub. No.: WO2013/132311
PCT Pub. Date: Sep. 12, 2013

(65) Prior Publication Data
US 2015/0101551 A1    Apr. 16, 2015

(30) Foreign Application Priority Data

Mar. 8, 2012  (JP) .................................. 2012-051385
May 1, 2012   (JP) .................................. 2012-104355

(51) Int. Cl.
*F02F 1/10*     (2006.01)
*B23K 33/00*    (2006.01)
(Continued)

(52) U.S. Cl.
CPC ............ *B23K 33/008* (2013.01); *B23K 26/323* (2015.10); *F02F 1/108* (2013.01); *F02F 1/14* (2013.01);
(Continued)

(58) Field of Classification Search
CPC .......... F01P 3/02; F01P 2003/021; F02F 1/10; F02F 1/14; F02F 1/16
(Continued)

(56) References Cited

U.S. PATENT DOCUMENTS

2003/0157404 A1    8/2003  Inoue et al.
2005/0150476 A1*   7/2005  Gohrbandt ................ F02F 1/16
                                                         123/193.2
(Continued)

FOREIGN PATENT DOCUMENTS

DE       199 15 960       10/2000
DE    10 2004 029 230      1/2006
(Continued)

OTHER PUBLICATIONS

Metals-Melting Temperatures, 2006, The Engineering Toolbox, p. 1.*
(Continued)

*Primary Examiner* — Hung Q Nguyen
*Assistant Examiner* — Charles Brauch
(74) *Attorney, Agent, or Firm* — Oblon, McClelland, Maier & Neustadt, L.L.P.

(57) ABSTRACT

A cylinder block (10) includes an inter-bore flow passage (14) between adjacent bores (12). Each inter-bore flow passage (14) is formed by closing an opening-side groove portion (15) continuous from a cylinder block deck face and a bottom-side groove portion (16) with the use of a lid member (20) made of copper, and the lid member (20 is laser-welded to a groove wall face of the opening-side
(Continued)

groove portion (15). Before the laser-welding, the lid member (20) has recesses (26) that are interspersed in a direction, in which a laser beam travels, at any one of connected portions at which the lid member (20 is connected to the groove wall face of the opening-side groove portion (15).

14 Claims, 9 Drawing Sheets

(51) Int. Cl.
    *F02F 1/40*    (2006.01)
    *F02F 1/14*    (2006.01)
    *F01P 3/02*    (2006.01)
    *F02F 1/24*    (2006.01)

(52) U.S. Cl.
    CPC ............ *F02F 1/40* (2013.01); *B23K 2203/10* (2013.01); *B23K 2203/12* (2013.01); *F01P 2003/024* (2013.01); *F02F 2001/104* (2013.01); *F02F 2001/244* (2013.01); *Y10T 29/49231* (2015.01)

(58) Field of Classification Search
    USPC ...................................................... 123/41.72
    IPC .................................................. F01P 2003/021
    See application file for complete search history.

(56) References Cited

U.S. PATENT DOCUMENTS

2006/0102110 A1* 5/2006 Takenaka .............. F02F 7/0021
                                                         123/41.82 A
2008/0245320 A1* 10/2008 Ishikawa ................... F02F 1/10
                                                         123/41.74

FOREIGN PATENT DOCUMENTS

| JP | 3 253752 | 11/1991 |
| JP | 6-330807 A | 11/1994 |
| JP | 7 269410 | 10/1995 |
| JP | 2000 90893 | 3/2000 |
| JP | 2002 361454 | 12/2002 |
| JP | 2010-277947 A | 12/2010 |
| JP | 2012 97719 | 5/2012 |

OTHER PUBLICATIONS

International Search Report Issued Jul. 5, 2013 in PCT/IB13/000416 Filed Mar. 4, 2013.

\* cited by examiner

LASER WELDING METHOD AND ENGINE COOLING STRUCTURE

BACKGROUND OF THE INVENTION

1. Field of the Invention

The invention relates to a laser welding method and an engine cooling structure of which members are welded by laser welding.

2. Description of Related Art

Welding with the use of an irradiated laser beam, different from arc welding, or the like, produces a smaller amount of slags, and may also be applied to welding of fine members and connected portions of thin sheet materials, so various suggestions have been made (for example, Japanese Patent Application Publication No. 2000-90893 (JP 2000-90893 A), and the like).

In JP 2000-90893 A, by reducing the material thickness of connected portions or providing cutouts at the outer edges of the respective connected portions, a battery case and a lid, each are made of aluminum having a low absorption of laser beam or an aluminum-based alloy, are welded to each other with the use of a low-power laser beam.

Incidentally, not limited to members made of aluminum or an aluminum-based alloy, welded members that are object to be welded by laser welding with the use of a laser beam have a variety of its dimensions, application portions, and the like, so it may be difficult to reduce the material thickness unlike a battery case. In addition, even when the absorption of a laser beam is increased by the cutouts of the outer edges of the connected portions, there is a limit of a depth at or below which melting occurs due to a laser beam (hereinafter, the depth is termed laser welding depth where appropriate). Therefore, in order to increase the reliability and strength of laser welding, there is a need to increase the laser welding depth.

In recent years, aluminum or an aluminum-based alloy is ordinarily used for a key component of a machine structural component; nevertheless, such a key component requires a mechanical strength in many cases. However, in laser welding, the reliability of ensuring the strength of welding is low due to a shallow laser welding depth, so application of laser welding to a key component has not been increasing so much.

SUMMARY OF THE INVENTION

The invention provides a new method of increasing a laser welding depth at the time when connected welded members are subjected to laser welding.

An aspect of the invention provides a laser welding method for welding a first member and a second member to each other with the use of a laser beam. The laser welding method includes: subjecting at least one of the first and second members to a pre-irradiation process in preparation for irradiation of the laser beam and then connecting the first and second members to each other in order to carry out welding with the use of the laser beam; and causing laser beam irradiated members to melt by irradiating the laser beam to connected portions of both the first and second members, and welding both the first and second members to each other through the melting, wherein, in the pre-irradiation process, a plurality of small absorption portions, which have a smaller absorption of the laser beam than both the first and second members, are formed at the connected portion of at least one of the first and second members at an interval in a direction in which the irradiated laser beam travels.

In the laser welding method according to this aspect, the irradiated laser beam travels at the connected portions of both the first and second members while melting the laser beam irradiated members with its energy, and increases its reaching depth. In the laser welding method according to the above-described aspect, the plurality of small absorption portions, which have a smaller absorption of the laser beam than both the first and second members, are interspersed at the connected portion of at least one of the first and second members at an interval in the direction in which the irradiated laser beam travels. Therefore, because the small absorption portions each have a small absorption of the laser beam, the laser beam that has reached the small absorption portions further travels to a deeper reaching depth without causing diffusion at the small absorption portions so much, and causes portions of the laser beam-irradiated members to melt, which are deeper in the direction in which the laser beam travels than the small absorption portions. In this case, the laser beam does not diffuse at the small absorption portions so much as described above; however, the laser beam melts portions of the laser beam irradiated members, facing the small absorption portions with its energy. Molten material of the melted laser beam irradiated members substantially fills the small absorption portions. This occurs at each of the small absorption portions that are interspersed in the direction in which the laser beam travels. Therefore, with the laser welding method according to the above-described aspect, it is possible to further increase the reaching depth of the irradiated laser beam, and it is possible to increase the above-described laser welding depth at which melting occurs due to the irradiated laser beam. An increase in the laser welding depth can improve the welding strength, so the laser welding method according to the above-described aspect may be applied to a mechanical manufacturing product for which it is indispensable to ensure the strength.

In the laser welding method according to the above-described aspect, in the pre-irradiation process, cutouts that respectively serve as the small absorption portions may be formed at the connected portion of the first member and/or the connected portion of the second member, which are objects at which the small absorption portions are formed, intermittently in the direction in which the irradiated laser beam travels. By so doing, it is possible to easily intersperse the small absorption portions, which have a small absorption of the laser beam, in the direction in which the laser beam travels with a simple method, that is, a method of forming cutouts. The insides of the interspersed cutouts are cavities, so the absorption of the laser beam is remarkably small, and allow the laser beam to travel without causing the diffusion of the laser beam so much, so the effectiveness of an increase in the laser welding depth increases. The effectiveness of an increase in the laser welding depth, that is, the effectiveness of an increase in the reaching depth of the laser beam, presumably increases because of the following reason.

At a portion at which irradiation of the laser beam is received (irradiated portion), molten material is produced through melting of the laser beam irradiated members, and stagnation of the molten material at the irradiated portion impedes an increase in the reaching depth of the laser beam. However, in the laser welding method according to the above-described aspect, at each of the cutouts interspersed in the direction in which the laser beam travels, it is possible to cause redundant molten material to escape from the cutout, so it is possible to further increase the reaching depth of the laser beam as described above. In addition, for gas that is produced in addition to molten material as a result of irradiation of the laser beam as well, it is possible to cause redundant gas together with redundant molten material to escape into a corresponding one of the cutouts. If redundant molten material or gas remains at the irradiated portion to which the laser beam is irradiated, a welding defect, such as a pinhole, due to the remaining molten material or gas tends to occur at the laser welding portion. However, in the laser welding method, it is possible to cause redundant molten material or gas to escape into a corresponding one of the cutouts as described above such that redundant molten material or gas does not remain at the irradiated portion to which the laser beam is irradiated. As a result, with the laser welding method according to the above aspect, it is possible to make a welding defect, such as a pinhole, not remain at the laser welding portion, so it is possible to contribute to improvement in the reliability and strength of laser welding.

In the laser welding method according to any one of the above aspects, in the pre-irradiation process, the small absorption portions may be formed at equal intervals in the direction in which the irradiated laser beam travels. By so doing, it is simple.

In the laser welding method according to any one of the above aspects, in the pre-irradiation process, the small absorption portions may be formed by narrowing a portion between the adjacent small absorption portions as a reaching depth of the laser beam increases. Generally, the energy of the laser beam attenuates as the reaching depth increases. However, the size of a portion between the small absorption portions reduces as the reaching depth increases, so it is possible to increase the reaching depth of the laser beam when melting is caused to occur at the narrow portion between the small absorption portions. Thus, the above aspect is able to contribute to an increase in the laser welding depth.

In the laser welding method according to any one of the above aspects, when both the members are welded to each other by irradiating the laser beam, laser beam scanning irradiation in which the laser beam is irradiated while a location to which the laser beam is irradiated is changed along the connected portions may be carried out, and, in the pre-irradiation process, each of the plurality of small absorption portions arranged in the direction in which the irradiated laser beam travels may be formed so as to extend over a scanning range of the laser beam scanning irradiation. At portions that melt by receiving irradiation of the laser beam, molten material and gas are produced, and the molten material substantially fills the small absorption portions within a range in which the laser beam has been irradiated; however, there occurs redundant molten material and, gas. With the laser welding method according to this aspect, it is possible to cause redundant molten material and gas to escape to a side at which the above-described laser beam scanning irradiation is not carried out. Thus, with the laser welding method according to the above aspect, it is possible to make a welding defect, such as a pinhole, due to remaining molten material or gas, not remain at the laser welding portion, so it is possible to contribute to improvement in the reliability and strength of laser welding.

In the laser welding method according to any one of the above aspects, the first and second members may be formed of different metal members or the same metal members. By so doing, it is possible to increase the laser welding depth in laser-welding of different metal members and laser-welding of the same metal members. Note that, when the first and second members are formed of different metal members, the member having a higher absorption of the laser beam melts, and both the first and second members are welded to each other; whereas, when the first and second members are formed of the same metal members, one or both of the first and second members melt, and both members are welded to each other.

In the laser welding method according to the above-described aspect, the first and second members may be formed of the different metal members having different tendencies to melt for the laser beam, then the first member may be formed of a metal member having a property such that the metal member has a less tendency to melt than that of the second member, and the small absorption portions may be formed at the first member. By so doing, the second member having a more tendency to melt melts, the molten material of the second member substantially fills the small absorption portions of the first member, and both the first and second members are welded to each other.

Another aspect of the invention provides a laser welding method for welding a first member and a second member to each other with the use of a laser beam by irradiating the laser beam to connected portions at which both the first member and the second member are connected so as to face each other. The laser welding method includes: forming a plurality of small absorption portions, which have a smaller absorption of the laser beam than both the first and second members, at at least one of the connected portion of the first member and the connected portion of the second member at an interval; and causing the first member and/or the second member to melt at the connected portions of the first and second members by irradiating the laser beam to the connected portions of the first and second members in a direction in which the small absorption portions formed at an interval are arranged, and welding the first and second members to each other through the melting.

With the laser welding method according to this aspect as well, as in the case of the above-described laser welding method, it is possible to improve the welding strength by increasing the laser welding depth.

In the laser welding method according to the above aspect, at the time of forming the plurality of small absorption portions, a plurality of cutouts that respectively serve as the small absorption portions may be formed at an interval at at least one of the connected portions. By so doing, it is possible to easily intersperse the small absorption portions, which have a small absorption of the laser beam with a simple method, that is, a method of forming cutouts, and, in addition, it is possible to improve the reliability and welding strength of laser welding by suppressing a welding defect, such as a pinhole, through causing redundant molten material and gas to escape into the cutouts.

In the laser welding method according to any one of the above aspects, at the time of irradiating the laser beam to the connected portions of the first and second members, laser beam scanning irradiation in which the laser beam is irradiated while a location to which the laser beam is irradiated is changed along the connected portions may be carried out, and, at the time of forming the plurality of small absorption portions at an interval, each of the plurality of small absorption portions may be formed so as to extend over a scanning range of the laser beam scanning irradiation. By so doing, by causing redundant molten material and gas to escape to a side at which the above-described laser beam scanning irradiation is not carried out, it is possible to improve the reliability and welding strength of laser welding by not leaving a welding defect, such as a pinhole, due to remaining molten material or gas at the laser welding portion.

In the laser welding method according to any one of the above aspects, at least one of the first and second members may be formed of a die casting. By so doing, the following advantages are obtained.

In comparison with low-pressure casting or vacuum die casting, a die casting method is able to mold a molding in a short period of time and is excellent in reduction in man-hour and cost; whereas, the low-pressure casting and the vacuum die casting have a small content of gas in a molding and involve less oxides or air, so an internal defect also reduces. However, in the die casting method, for example, because the molding has a large content of gas or a remaining internal defect due to involved oxides or air, high-level process control, or the like, is required for heat treatment and welding at high temperatures, and it is difficult to carry out heat treatment and welding at high temperatures. However, with the laser welding method according to the above-described aspect, it is possible not to leave molten material or gas, which is produced at the time when a die casting at the irradiated portion that has received irradiation of the laser beam melts, at the irradiated portion of the laser beam by causing molten material and gas to escape into the corresponding small absorption portions (cutouts) as described above. As a result, with the laser welding method according to the above aspect, it is possible to implement laser welding of a die casting that is not appropriate for welding by ensuring a high welding strength with a superiority in reduction of man-hours and cost.

Further another aspect of the invention provides an engine cooling structure in which a cylinder block includes a plurality of bores and adjacent bores are cooled by refrigerant that passes through an inter-bore flow passage. The engine cooling structure includes: a groove portion that is formed on the cylinder block and is located between the adjacent bores; and a lid member that is fitted to the groove portion to close an opening side of the groove portion, that forms the inter-bore flow passage together with the groove portion and that is laser-welded to a wall face of the groove portion with the use of an irradiated laser beam, wherein the lid member has a plurality of cutouts at a connected portion that is connected to the wall face of the groove portion at an interval in a direction in which the irradiated laser beam travels.

With the engine cooling structure according to this aspect, at the time of forming the inter-bore flow passage by closing the opening side of the groove portion between the adjacent bores, the lid member fitted to the groove portion is laser-welded to the groove wall face with the use of the laser beam. The laser beam irradiated at the time of this laser welding travels at the wall face of the groove portion while melting a cylinder block groove wall face portion of the groove portion having no cutout, thus increasing its reaching depth. Then, when the laser beam reaches the cutouts of the lid member, the laser beam travels a deeper reaching depth without diffusion at the cutouts, and melt the cylinder block groove wall face portion at a portion deeper in the direction in which the laser beam travels than the cutouts. In this case, the laser beam does not diffuse at the cutouts as described above; however, the laser beam melts the cylinder block groove wall face portion at portions facing the cutouts with its energy. Molten material of the melted cylinder block groove wall face portion substantially fills the cutouts. This occurs at each of the cutouts of the lid member, which are interspersed in the direction in which the laser beam travels. With the engine cooling structure according to the above-described aspect, it is possible to laser-weld the lid member to the groove wall face with a high welding strength by increasing the laser welding depth through increasing the reaching depth of the irradiated laser beam.

In the engine cooling structure according to the above-described aspect, the lid member may be laser-welded to the wall face of the groove portion by receiving laser beam scanning irradiation in which the laser beam is irradiated while a location at which the laser beam is irradiated is changed along a closing range in which the lid member closes the opening side of the groove portion, and the lid member may have the plurality of cutouts that are arranged in the direction in which the irradiated laser beam travels and that are extended over a scanning range of the laser beam scanning irradiation. At portions that melt by receiving irradiation of the laser beam, molten material and gas are produced, and the molten material substantially fills the cutouts within a range in which the laser beam has been irradiated; however, there occurs redundant molten material and gas. With the engine cooling structure according to this aspect, by causing redundant molten material and gas to escape to a side at which the above-described laser beam scanning irradiation is not carried out, it is possible to laser-weld the lid member to the groove wall face with a high welding strength by not producing a welding defect, such as a pinhole, due to remaining molten material or gas. As a result, with the engine cooling structure according to this aspect, it is possible to flow refrigerant through the inter-bore flow passage at a high pressure, so it is possible to increase a flow rate or a circulation amount, and, therefore, it is possible to increase the efficiency of engine cooling.

In the engine cooling structure according to any one of the above-described aspects, the lid member may have a through-hole that extends through toward a side adjacent to a bottom portion of the inter-bore flow passage and a protruding portion that protrudes toward the side adjacent to the bottom portion of the inter-bore flow passage and that facilitates refrigerant, passing through the inter-bore flow passage, to pass through the through-hole. Usually, a cylinder head that closes the bores is mounted on the cylinder block, and the cylinder head also has a refrigerant flow passage that overlaps with the inter-bore flow passage of the cylinder block. With the engine cooling structure according to the above-described aspect, refrigerant that passes through the inter-bore flow passage of the cylinder block is caused to easily pass through the through-hole by the protruding portion of the lid member, so it is possible to easily flow refrigerant to the refrigerant flow passage of the cylinder head as well, and, therefore, it is possible to increase the efficiency of engine cooling.

In the engine cooling structure according to any one of the above-described aspects, the lid member may have the protruding portion at an end portion downstream of the refrigerant passing through the inter-bore flow passage. By so doing, refrigerant flows through substantially the entire inter-bore flow passage and then flows from the through-hole into the refrigerant flow passage of the cylinder head, so it is possible to increase the efficiency of engine cooling while ensuring the cooling efficiency of the cylinder block side.

In the engine cooling structure according to any one of the above-described aspects, the cylinder block may be formed of a die casting (for example, aluminum die casting), and the lid member may be made of copper. By so doing, it is easy to apply the engine cooling structure to an existing engine cooling structure. In addition, in the cylinder block formed of a die casting, it is possible to form the engine cooling structure with a high welding strength while ensuring a superiority in reduction in man-hour and cost.

Yet another aspect of the invention provides a manufacturing method for an engine that includes an engine cooling structure in which a cylinder block includes a plurality of bores and the adjacent bores are cooled by refrigerant that passes through an inter-bore flow passage. The manufacturing method includes: forming a closed-end groove portion between the adjacent bores in the cylinder block; preparing a lid member that is fitted to the groove portion to close an opening side of the groove portion and that forms the inter-bore flow passage together with the groove portion; forming a plurality of recesses on a lid member-side connected face, at which the prepared lid member is connected to a wall face of the groove portion, at an interval over a range from an upper end of the lid member to a lower end of the lid member; connecting the wall face of the groove portion to the lid member-side connected face of the lid member by fitting the lid member, on which the plurality of recesses are formed, to the groove portion; melting a portion of the wall face of the groove portion of the cylinder block by irradiating a laser beam to connected portions at which the wall face of the groove portion is connected to the lid member-side connected face of the lid member in a direction in which the plurality of recesses formed at an interval are arranged; and welding the lid member to the wall face of the groove portion of the cylinder block through the melting.

With the manufacturing method for an engine according to this aspect, it is possible to easily provide the engine that includes the engine cooling structure in which the lid member is laser-welded to the groove wall face at a high welding strength by increasing the laser welding depth.

In the manufacturing method for an engine according to the above-described aspect, at the time of irradiating the laser beam to the connected portions at which the wall face of the groove portion is connected to the lid member-side connected face of the lid member, it is possible to irradiate the laser beam while changing a location at which the laser beam is irradiated along the connected portions or it is possible to prepare the cylinder block formed of a die casting. By so doing, it is possible to easily provide the engine that includes the engine cooling structure that has the above-described advantages.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1A:
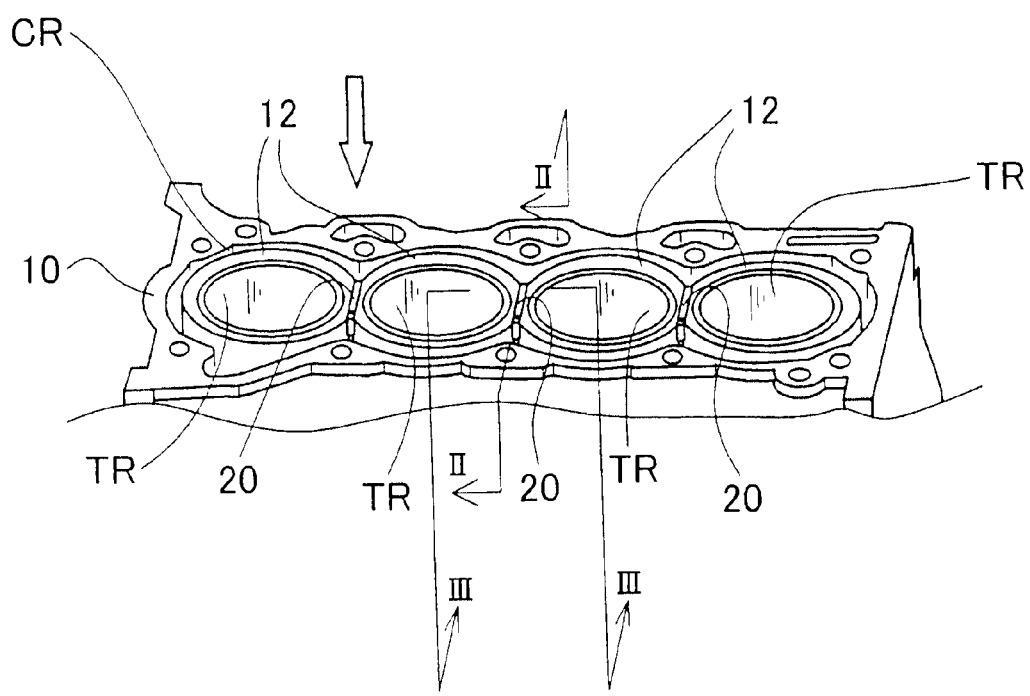
FIG. 1A is a perspective view of a cylinder block of an engine cooling structure according to an embodiment.
Figure 1B:
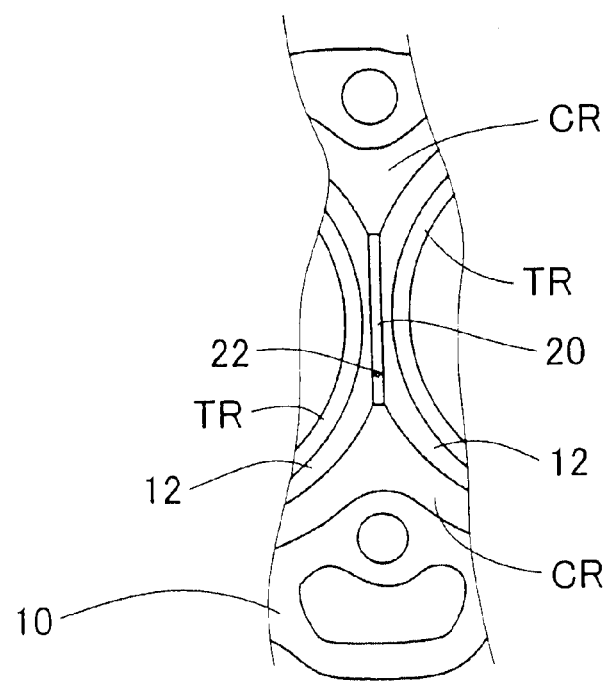
FIG. 1B is an enlarged plan view of a relevant portion of the cylinder block.
Figure 2:
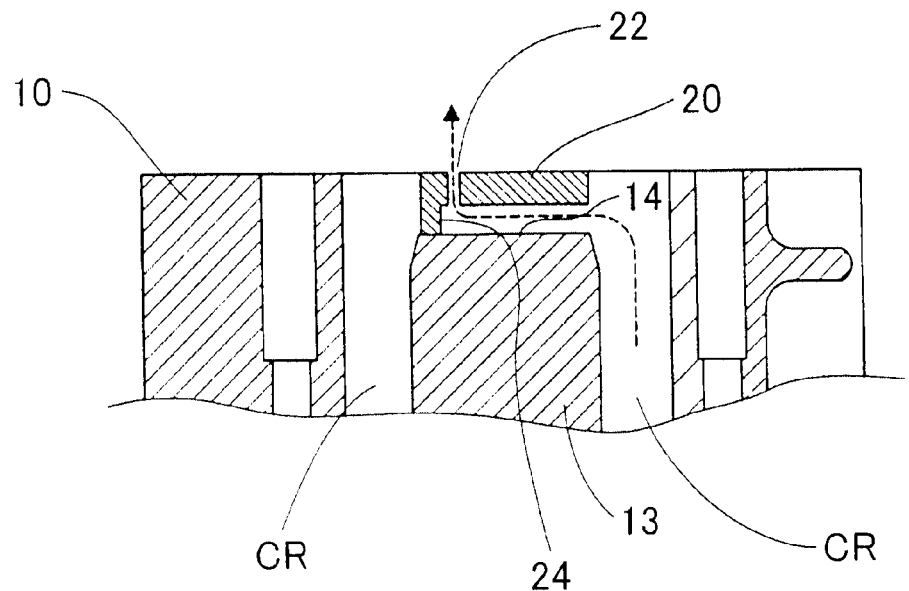
FIG. 2 is a schematic cross-sectional view taken along the line II-II in FIG. 1A.
Figure 3:
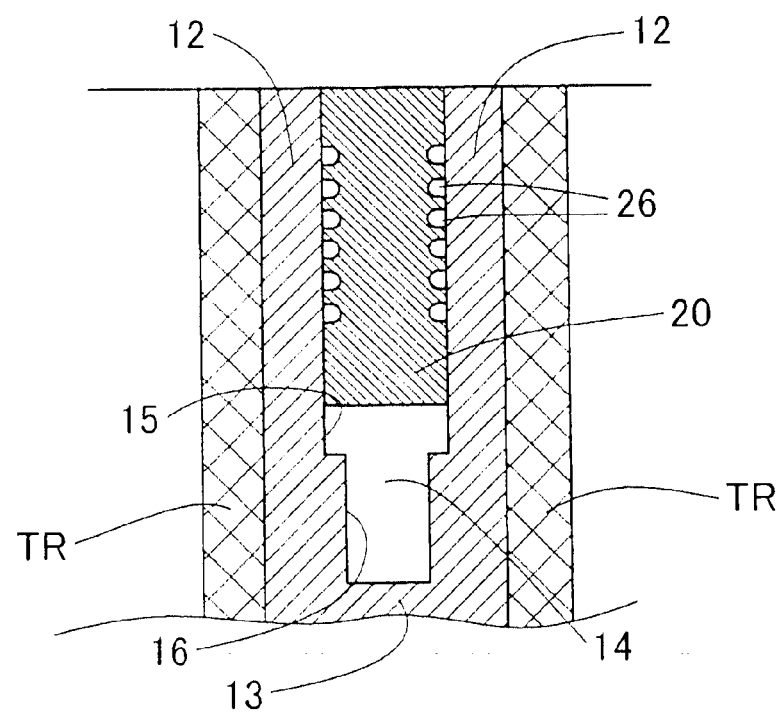
FIG. 3 is an enlarged schematic cross-sectional view taken along the line III-III in FIG. 1A.
Figure 4:
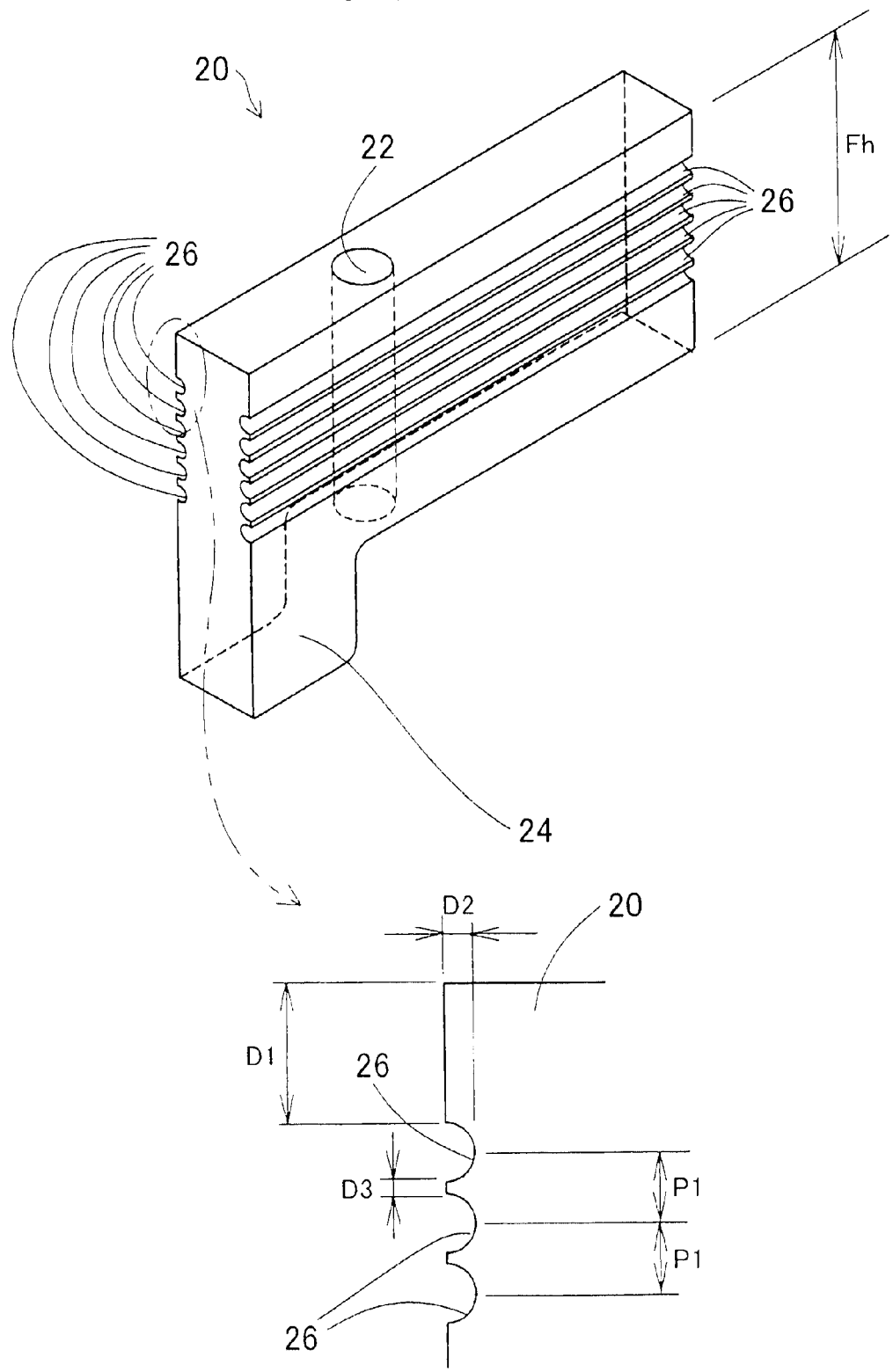
FIG. 4 is a schematic perspective view of a lid member that is laser-welded to the cylinder block and an enlarged view of a relevant portion of the lid member.

Hereinafter, an embodiment of the invention will be described with reference to the accompanying drawings. FIG. 1A is a perspective view of a cylinder block 10 of an engine cooling structure according to the embodiment. FIG. 1B is an enlarged plan view of a relevant portion of the cylinder block 10. FIG. 2 is a schematic cross-sectional view that is taken along the line II-II in FIG. 1A. FIG. 3 is an enlarged schematic cross-sectional view that is taken along the line III-III in FIG. 1A. FIG. 4 is a schematic perspective view of a lid member 20 that is laser-welded to the cylinder block 10 and an enlarged view of a relevant portion of the lid member 20.

The cylinder block 10 is an aluminum die casting, and constitutes an engine together with a cylinder head (not shown). As shown in FIG. 1A and FIG. 1B, the cylinder block 10 is used in a four-cylinder engine, and includes bores 12 corresponding to the number of cylinders. Other than the above, the cylinder block 10 includes a water jacket CR that surrounds the bores 12. The cylinder block 10 is an open deck-type cylinder block of which the water jacket CR is open at a deck face. In addition, the cylinder block 10 includes an inter-bore flow passage 14 (see FIG. 2 and FIG. 3) at an inter-bore portion 13 between any adjacent bores 12. The engine, including surroundings of the bores, is cooled by refrigerant that passes through the water jacket CR and the inter-bore flow passages 14. In this case, the water jacket CR is formed as a circulation flow passage that circulates around the bores, and, as indicated by the dotted line in FIG. 2, each inter-bore flow passage 14 introduces refrigerant from the water jacket CR to a refrigerant flow passage of the cylinder head (not shown) above the cylinder block 10. Note that a piston liner TR made of cast iron is assembled to each of the bores 12.

As shown in FIG. 1A to FIG. 3, each inter-bore flow passage 14 is closed by the corresponding lid member 20 at a side adjacent to the deck face of the cylinder block 10. As shown in FIG. 4, each lid member 20 includes a through-hole 22, a protruding portion 24 and a plurality of recesses 26. The protruding portion 24 protrudes toward the lower end of the lid member 20 in the drawing. The plurality of recesses 26 extend in streaks. Each lid member 20 is assembled as shown in FIG. 2, so the through-hole 22 extends through the lid member 20 toward a side adjacent to the bottom portion of the inter-bore flow passage 14, and the protruding portion 24 facilitates refrigerant, passing through the inter-bore flow passage 14 as indicated by the dotted line in FIG. 2, to pass through the through-hole 22. In addition, the protruding portion 24 is located at an end portion that is located downstream of refrigerant that passes through the inter-bore flow passage 14, so the protruding portion 24 guides refrigerant, which has passed through substantially the entire route of the inter-bore flow passage 14, toward the through-hole 22.

Each inter-bore flow passage 14 formed in the inter-bore portion 13 between any adjacent bores 12 includes an opening-side groove portion 15 adjacent to the deck face and a bottom-side groove portion 16 having a narrower flow passage width than the opening-side groove portion 15. The corresponding lid member 20 closes the opening-side groove portion 15. The lid member 20 is a plate member made of copper with the same thickness as the flow passage width of the opening-side groove portion 15. As shown in the enlarged view in FIG. 4, the recesses 26 are formed into multiple streaks from a location at a distance D1 from the upper end of the lid member 20 with a recess depth D2, an inter-recess size D3 and a recess pitch P1. In the present embodiment, in consideration of the above-described thickness of the lid member 20 and melting of a groove wall face of the inter-bore flow passage 14 of the cylinder block 10 at the time of laser welding (described later), the distance D1 is set to 0.5 to 1 mm, the recess depth D2 is set to about 0.2 mm, the inter-recess size D3 is set to about 0.1 mm, and the recess pitch P1 is set to a constant pitch of about 0.5 mm. The number of the recesses 26 formed may be increased on the basis of a desired reaching depth to which a laser beam reaches. In the present embodiment, the lid height Fh of the lid member 20, shown in FIG. 4, is set to about 8 mm, and the number of the recesses 26 formed is set to 6 to 10 streaks. The recesses 26 formed in this case range over 5 to 7 mm from the upper face of a lid body. These fine recesses 26 may be cut with the use of a cutting tool, such as a diamond cutter, or may be pressed with the use of a roller having a press uneven blade, corresponding to unevenness formed by the plurality of recesses 26, at its outer periphery.

Each through-hole 22 is formed into a through-hole having a diameter of about 1 mm by electric discharge machining, or the like. Among these sizes, the thickness of each lid member 20 and the recess depth D2 may be changed as needed on the basis of the inter-bore size of the bores 12, which can be set for the cylinder block 10, and the distance D1, the inter-recess size D3 and the recess pitch P1 may be changed by the power of an irradiated laser beam or the type of a laser beam.

Figure 5:
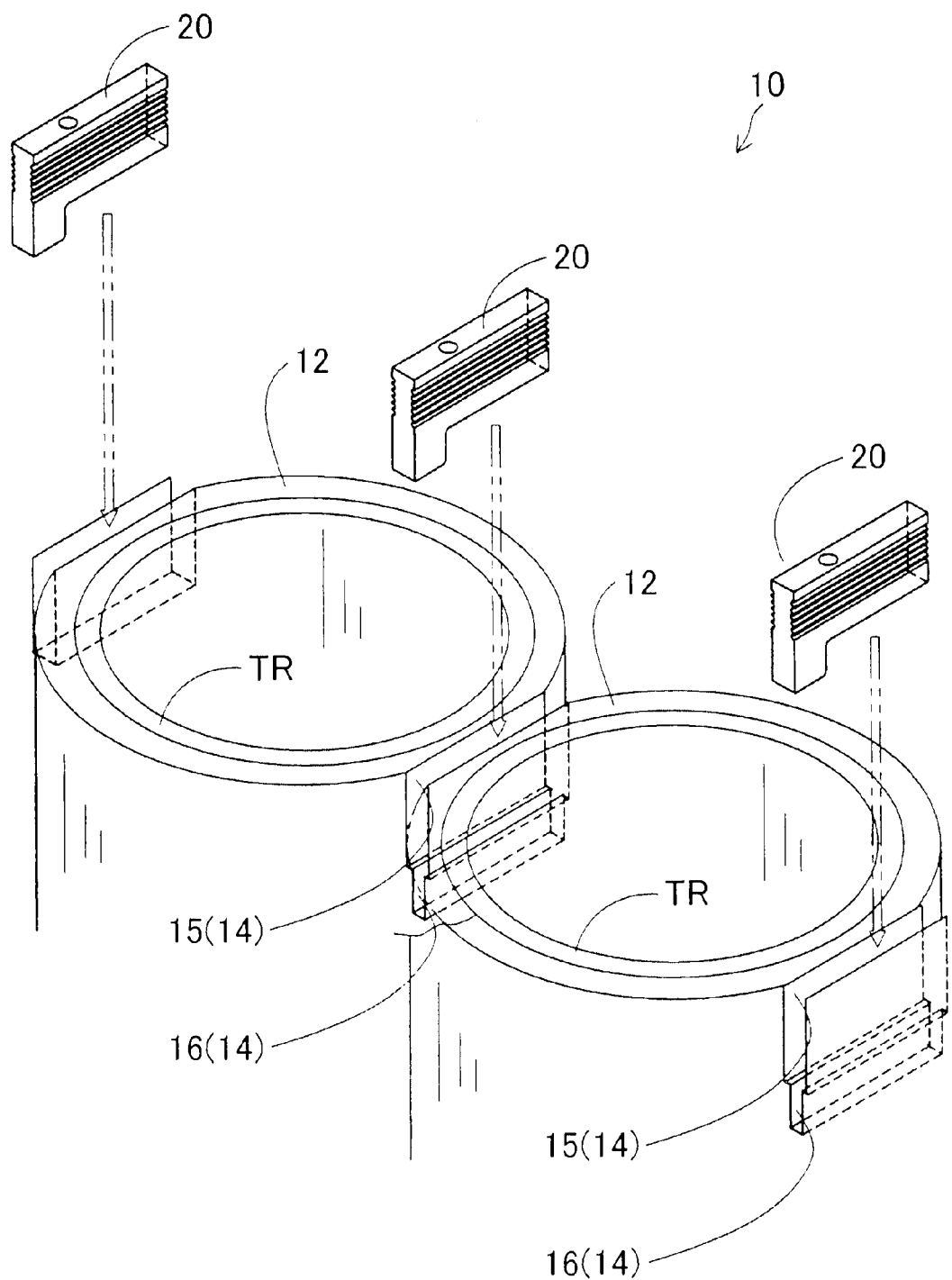
FIG. 5 is a state before laser-welding of a portion between adjacent bores and a state of assembling each lid member.
Figure 6A:
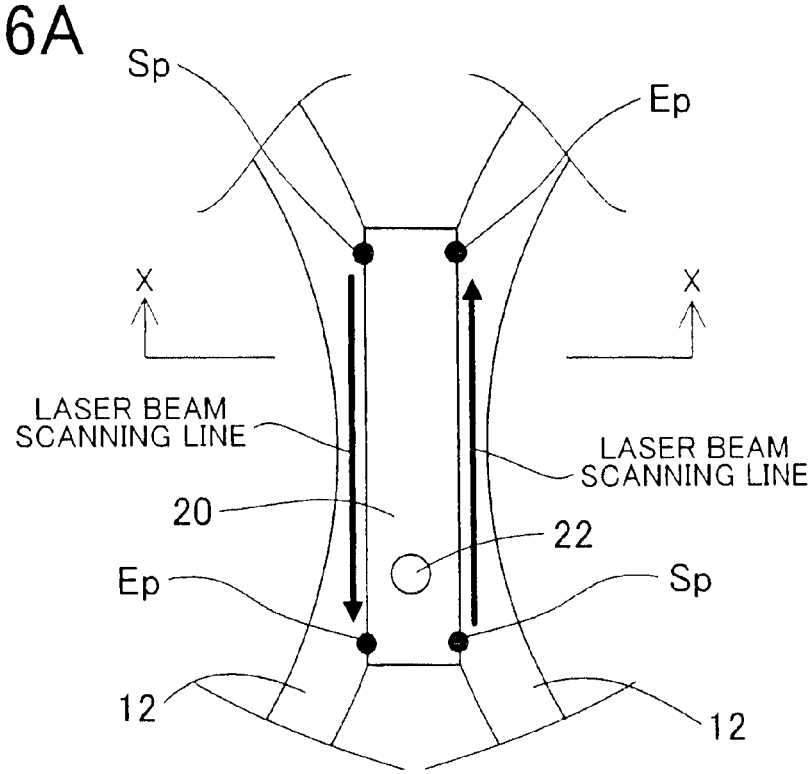
FIG. 6A is a plan view of a state of laser welding through irradiation of a laser beam.
Figure 6B:
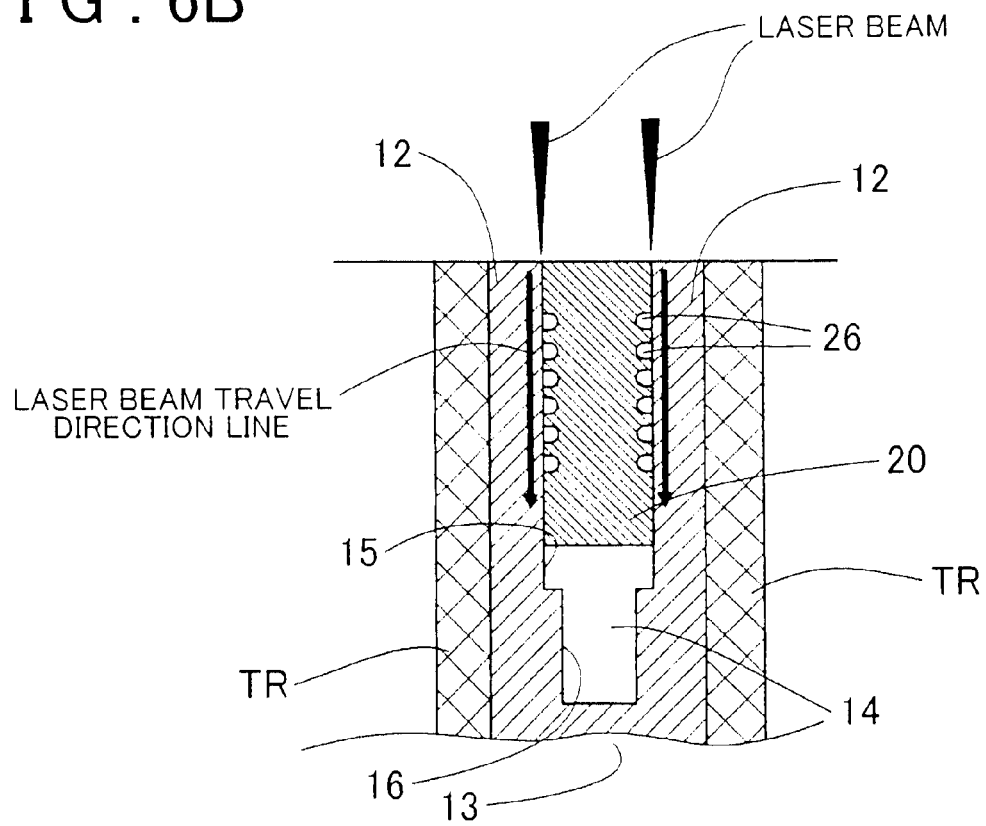
FIG. 6B is a cross-sectional view of a state of laser welding through irradiation of a laser beam.
Figure 7:
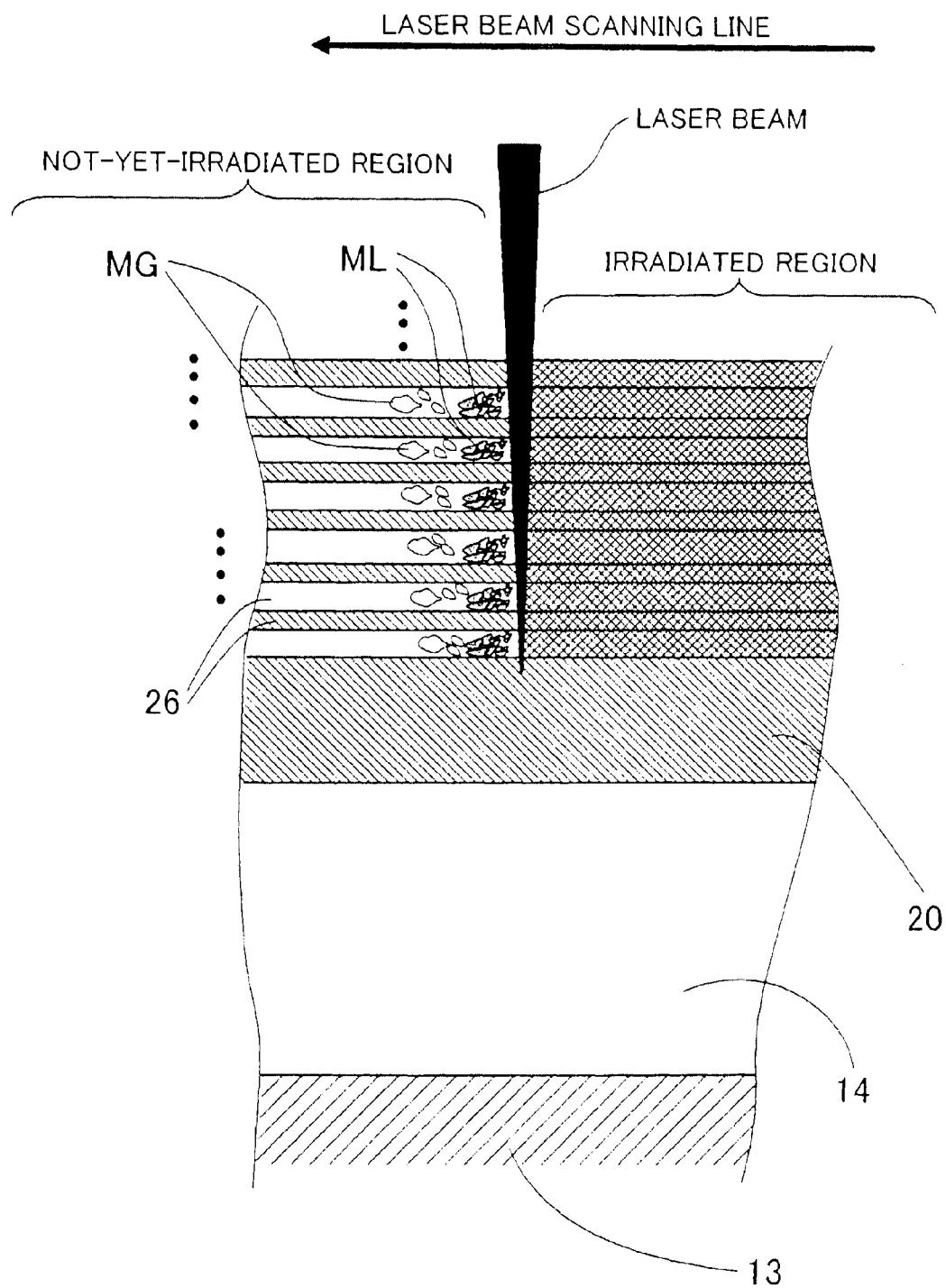
FIG. 7 is a schematic view of a state of laser welding at the time of scanning a laser beam while changing an irradiated location of the laser beam.

Next, a laser welding method for each lid member 20 will be described. FIG. 5 is a state before later-welding of a portion between any adjacent bores 12 and a state of assembling each lid member 20. FIG. 6A is a plan view of a state of laser welding through irradiation of a laser beam. FIG. 6B is a cross-sectional view of a state of laser welding through irradiation of a laser beam. FIG. 7 is a schematic view of a state of laser welding at the time of scanning a laser beam while changing an irradiated location of the laser beam.

As shown in FIG. 5, in the cylinder block 10, the opening-side groove portion 15 and the bottom-side groove portion 16 are formed between any adjacent bores 12 with different groove widths. In this case, the opening-side groove portion 15 and the bottom-side groove portion 16 are formed by subjecting the cylinder block 10 to slitting with the use of, for example, rotary cutters having different thicknesses. The groove width of the opening-side groove portion 15 is set to a width adapted to be fitted to the lid member 20, and the groove depth is set to the same size as a size from the upper face of the lid member 20, shown in FIG. 4, to the top of the protruding portion 24.

In parallel with or in advance of the above-described formation of the groove portions, the recesses 26 are formed in each lid member 20 with the above-described various sizes. Alternatively, the lid members 20 each having the recesses 26 are prepared. Subsequently, each lid member 20 is fitted to the corresponding opening-side groove portion 15 until the top of the protruding portion 24 contacts the step-shaped bottom face of the opening-side groove portion 15. By so doing, each lid member 20 closes the opening sides of the bottom-side groove portion 16 and opening-side groove portion 15, and forms the corresponding inter-bore flow passage 14 together with these groove portions. When each lid member 20 is fitted to the corresponding opening-side groove portion 15 in this way, the recesses 26 are closed by the groove wall face of the corresponding opening-side groove portion 15, and the inside of each recess 26 forms a cavity, so the absorption of a laser beam reduces. Thus, fitting each lid member 20 having the recesses 26 to the corresponding opening-side groove portion 15 is a preparation for irradiation of a laser beam (described later) for laser-welding the lid member 20 to the opening-side groove portion 15 of the cylinder block 10. Through the fitting, the lid member 20 is connected to the groove wall face of the opening-side groove portion 15 of the cylinder block 10. A state of the connection is shown in FIG. 3.

Subsequent to fitting of each lid member 20, as shown in FIG. 6A to FIG. 7, a laser beam is irradiated to the groove wall face of the above-described opening-side groove portion 15, which is a connected portion at which the cylinder block 10 is connected to the lid member 20. In the plan view of FIG. 6A, an irradiation start point Sp and irradiation end point Ep of a laser beam are shown, and both points coincide with the groove wall face of the above-described opening-side groove portion 15. That is, a laser beam is irradiated while its irradiated location is changed from the irradiation start point Sp that coincides with the upper end of the groove wall face of the above-described opening-side groove portion 15 along the upper end of the groove wall face of the opening-side groove portion 15, and is irradiated to the irradiation end point Ep that coincides with the upper end of the groove wall face. In the present embodiment, laser beam scanning irradiation is carried out from the irradiation start point Sp to the irradiation end point Ep in this way. The laser beam to be irradiated may be a laser beam, such as YAG laser and carbon dioxide gas laser, and just needs to be able to melt the aluminum die-cast cylinder block 10 on the groove wall face of the above-described opening-side groove portion 15. The power of the laser beam also just needs to be able to melt the aluminum die-cast cylinder block 10 on the groove wall face of the above-described opening-side groove portion 15. In the present embodiment, a carbon dioxide gas laser beam is scanned and irradiated at a power of 4 kw as described above.

In the cross-sectional view of FIG. 6B, a state of laser beam irradiation at a certain irradiated location of the laser beam, and the laser beam travels from the upper end of the groove wall face of the opening-side groove portion 15 toward the bottom portion of the opening-side groove portion 15. The recesses 26 will be described in association with the travel direction of the laser beam. Through fitting of each lid member 20 as a preparation for irradiation of a laser beam, the recesses 26 having a small absorption of the laser beam are interspersed along the travel direction of the irradiated laser beam. A state of the interspersed recesses 26 is the same before irradiation of the laser beam, so, through fitting of each lid member 20 as a preparation for irradiation of a laser beam, the recesses 26 having a small absorption of the laser beam are interspersed along the travel direction of the irradiated laser beam. FIG. 7 shows a state of laser beam irradiation in process of laser beam scanning irradiation from the irradiation start point Sp to the irradiation end point Ep, and an area in which the laser beam has been irradiated increases as the irradiation location of the laser beam travels along a scanning line.

In the cylinder block 10 according to the above-described embodiment, at the time of forming the inter-bore flow passage 14 between any adjacent bores 12, the lid member 20 having the plurality of recesses 26 is fitted to the corresponding opening-side groove portion 15 that constitutes the inter-bore flow passage 14, thus closing the opening sides of the bottom-side groove portion 16 and opening-side groove portion 15. By so doing, each lid member 20 is connected to the groove wall face of the corresponding opening-side groove portion 15 of the cylinder block 10, and the recesses 26 of the lid member 20 are closed by the groove wall face of the opening-side groove portion 15. Thus, the inside of each recess 26 forms a cavity, and the recesses 26 are interspersed in a direction, in which the depth of the opening-side groove portion 15 increases, as regions having a small absorption of the laser beam. Then, the laser beam is irradiated to the above-described groove wall face of each opening-side groove portion 15, which is a connected portion at which each lid member 20 is connected to the cylinder block 10. By so doing, each lid member 20 is laser-welded to the cylinder block 10, and the inter-bore flow passages 14 are formed. In the present embodiment, each lid member 20 is made of copper, so the lid member 20 has a less tendency to melt for the laser beam than the aluminum die-cast cylinder block 10. As shown in FIG. 6A and FIG. 6B, the direction in which the depth of the opening-side groove portion 15 increases is the travel direction of the laser beam to be irradiated, so each lid member 20 has the recesses 26 (more specifically, the internal spaces of the recesses 26) that are regions having a small absorption of the laser beam and that are interspersed at a constant pitch in the travel direction of the laser beam.

In the cylinder block 10 according to the present embodiment, in order to laser-weld each lid member 20 to the cylinder block 10, the laser beam is irradiated to the above-described groove wall face of the corresponding opening-side groove portion 15. The irradiated laser beam travels at the groove wall face in the travel direction that coincides with the direction in which the depth of the opening-side groove portion 15 increases, thus increasing the reaching depth. In the present embodiment, each lid member 20 and the cylinder block 10 have different tendencies to melt for the laser beam due to the above-described difference in raw material, and the aluminum die-cast cylinder block 10 has a more tendency to melt for the laser beam. Thus, at the time when the laser beam travels while increasing its reaching depth as described above, the laser beam travels while melting the cylinder block 10 at a portion of the groove wall face of the opening-side groove portion 15 with its energy. Then, when the laser beam reaches the recesses 26 of the lid member 20, the laser beam travels while further increasing the reaching depth without diffusion at the recesses 26, and melts the portion of the groove wall face of the opening-side groove portion 15 deeper in the travel direction of the laser beam than the recesses 26. The melting occurs at the portion of the groove wall face of the opening-side groove portion 15 that is connected to the portion indicated by the inter-recess size D3 between any adjacent recesses 26 shown in FIG. 4. In this case, the laser beam does not diffuse at the recesses 26 as described above; however, the laser beam melts the portion of the groove wall face of the opening-side groove portion 15 at portions facing the recesses 26 with its energy. Molten material of these melted portions of the groove wall face substantially fills the recesses 26. This occurs at each of the recesses 26 of the lid member 20, which are interspersed in the direction in which the laser beam travels. Therefore, with the cylinder block 10 according to the present embodiment, at the time of forming the inter-bore flow passages 14 that constitute the engine cooling structure through laser-welding of the lid members 20 made of copper, the laser welding depth is increased by increasing the reaching depth of the laser beam to be irradiated, so it is possible to laser-weld each lid member 20 made of copper to the groove wall face of the corresponding opening-side groove portion 15 of the aluminum die-cast cylinder block 10 with high welding strength.

In this case, in the cylinder block 10 according to the present embodiment, at the time of implement laser welding having a deep reaching depth as described above, the plurality of recesses 26 of each lid member 20 just need to be formed at a constant pitch in advance in the direction in which the laser beam travels, so it is simple. That is, it is possible to increase the laser welding depth and improve the welding strength associated with the laser welding depth with a simple method, that is, a method of forming the recesses 26.

In the cylinder block 10 according to the present embodiment, as shown in FIG. 6A to FIG. 7, to laser-weld each lid member 20 to the groove wall face of the corresponding opening-side groove portion 15 of the cylinder block 10, which is a connected portion at which the lid member 20 is connected, laser beam scanning irradiation is carried out. In this laser welding scanning irradiation, the laser beam is irradiated while a laser beam irradiated location changes along the upper end of the groove wall face over the range from the above-described irradiation start point Sp that coincides with the upper end of the groove wall face of the opening-side groove portion 15 to the above-described irradiation end point Ep that coincides with the upper end of the groove wall face of the opening-side groove portion 15. Then, the recesses 26 interspersed in the direction in which the irradiated laser beam travels as well are extended over the above-described scanning range of the laser beam scanning irradiation. At portions that melt by receiving irradiation of the laser beam, molten material and gas are produced, and the molten material substantially fills the recesses 26 within a range in which the laser beam has been irradiated; however, there occurs redundant molten material and gas. In the cylinder block 10 according to the present embodiment, as shown in FIG. 7, redundant molten material and gas are caused to escape to a side to which laser beam scanning irradiation is carried out thereafter. As a result, in the cylinder block 10 according to the present embodiment, it is possible to laser-weld each lid member 20 to the groove wall face of the corresponding opening-side groove portion 15 with high welding strength while not producing a welding defect, such as a pinhole, due to molten material or gas remaining at the portion at which the lid member 20 is laser-welded, so it is possible to flow refrigerant to each inter-bore flow passage 14 at a high pressure. Therefore, it is possible to flow refrigerant to each inter-bore flow passage 14 and the water jacket CR that communicates with the flow passage at a high flow rate or a high circulation amount, so the efficiency of engine cooling improves.

The cylinder block 10 to which each lid member 20 has been laser-welded as described above is cut along the line III-III in FIG. 1A, and then the cutting face is observed by a microscope. By so doing, it was confirmed that the laser beam has reached over the range in which the recesses 26 are formed 5 to 7 mm from the upper face of each lid member 20 (see FIG. 4). When the lid member 20 having no recesses 26 is similarly laser-welded, the reaching depth of the laser beam is about 3 mm, so, with the laser welding method according to the present embodiment, the fact that it is possible to perform laser welding with an increased reaching depth has been tested.

In addition, in the cylinder block 10 according to the present embodiment, each lid member 20 that forms the inter-bore flow passage 14 has the through-hole 22 as described above, and the protruding portion 24 protruding toward the bottom portion of the inter-bore flow passage 14 facilitates refrigerant, passing through the inter-bore flow passage 14, to pass through the through-hole 22. A cylinder head that forms combustion chambers corresponding to the respective bores 12 is mounted on the deck face of the cylinder block 10 according to the present embodiment, and the cylinder head has refrigerant passages that respectively overlap with the inter-bore flow passages 14 of the cylinder block 10. With the cylinder block 10 according to the present embodiment, refrigerant that passes through each inter-bore flow passage 14 is caused to easily pass through the through-holes 22 by the protruding portions 24 of the respective lid members 20, so it is possible to easily flow refrigerant to the refrigerant flow passages of the cylinder head as well. As a result, with the cylinder block 10 according to the present embodiment, it is possible to increase the efficiency of engine cooling.

In the cylinder block 10 according to the present embodiment, by providing the protruding portion 24 at one end side of each lid member 20, refrigerant that passes through the corresponding inter-bore flow passage 14 is guided to the through-hole 22 at a side adjacent to the downstream-side end portion. Thus, refrigerant flows through substantially the entire inter-bore flow passage 14 and then flows from the through-hole 22 into the refrigerant flow passage of the cylinder head. As a result, with the cylinder block 10 according to the present embodiment, it is possible to increase the cooling efficiency of the engine overall, including the cylinder head, while ensuring the cooling efficiency at the side of the cylinder block 10.

In the present embodiment, even when the cylinder block 10 is formed of an aluminum die casting as in the case of the existing cylinder block and each lid member 20 is made of copper that is relatively hard to be welded to aluminum or an aluminum-based alloy, it is possible to firmly laser-weld the lid members 20 made of copper to the cylinder block 10. Thus, it is possible to widen the application range of the existing engine.

In addition, in the present embodiment, the cylinder block 10 is formed of an aluminum die casting as in the case of the existing cylinder block, so, while superiority over a reduction in man-hour and cost is ensured, it is possible to increase the reliability and strength of the engine cooling structure by firmly laser-welding the lid members 20 made of copper to the cylinder block 10.

Figure 8A:
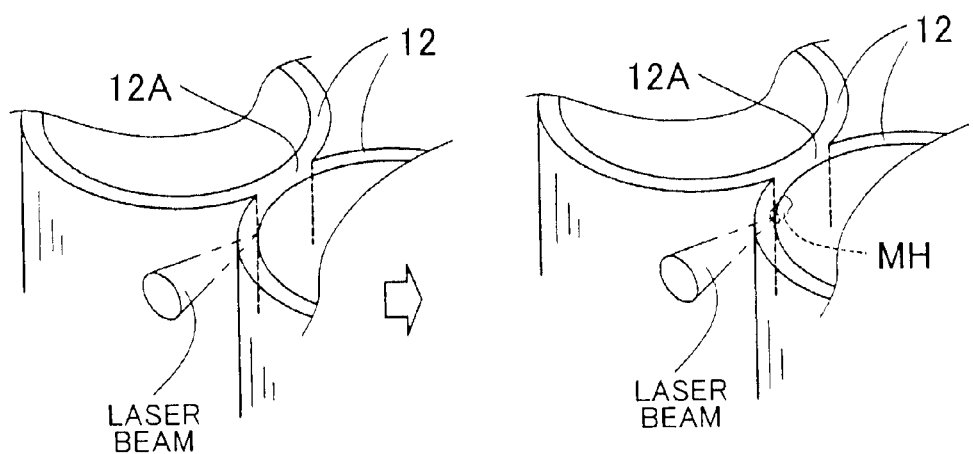
FIG. 8A and FIG. 8B are schematic views of a state of a demonstration test for a depth to which a laser beam reaches.
Figure 8B:
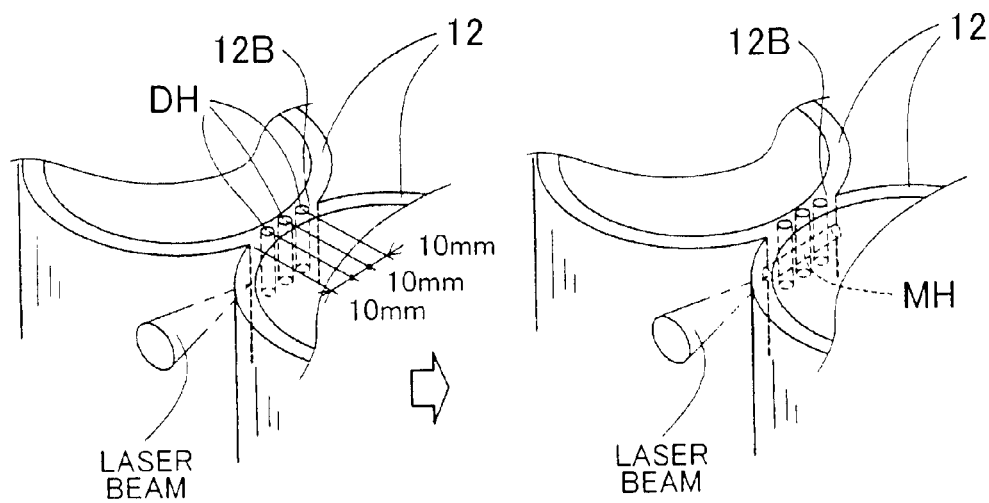

Next, a demonstration of an increase in the reaching depth of a laser beam through the above-described laser welding method according to the present embodiment will be described. FIG. 8A and FIG. 8B are views that schematically show a state of a demonstration test for the reaching depth of a laser beam. As shown in the drawing, a carbon dioxide gas laser beam having a power of 4 kw was continuously irradiated for about one second to each coupling portion that couples any adjacent two bores 12 before the corresponding inter-bore flow passage 14 was formed. Coupling portions to be compared are a coupling portion 12A in a state where the adjacent bores 12 are just coupled to each other and a coupling portion 12B in which 3 mm-diameter closed-end holes are perforated at a pitch of 10 mm with a drill. The drilled holes arranged at a constant pitch function similarly to the plurality of recesses 26 in each lid member 20 due to a state of the perforated holes with respect to the direction in which the laser beam travels. When the laser beam was irradiated to the above-described two coupling portions, in the coupling portion 12A in a state where the adjacent bores 12 are just coupled to each other, and a melted hole MH formed through melting was only a depth of about several millimeters from an irradiated point, and the reaching depth of the laser beam was also several millimeters. In contrast to this, in the coupling portion 12B in which the drilled holes that function similarly to the plurality of recesses 26 in each lid member 20 are arranged, a melted hole MH was formed to extend through the coupling portion 12B (about 40 mm). This proves that, by forming the above-described plurality of recesses 26 in each lid member 20, the reaching depth of the laser beam at the time of laser-welding of the lid member 20 is increased and, as a result, it is possible to increase the laser welding depth. In this case, when a through-hole is simply formed with the use of the laser beam or a deep closed-end hole is simply formed with the use of the laser beam, it is possible to easily form a through-hole or a deep closed-end hole by forming holes, such as drilled holes, that intersect with the direction in which the laser beam travels so as to be arranged in the travel direction.

Figure 9:
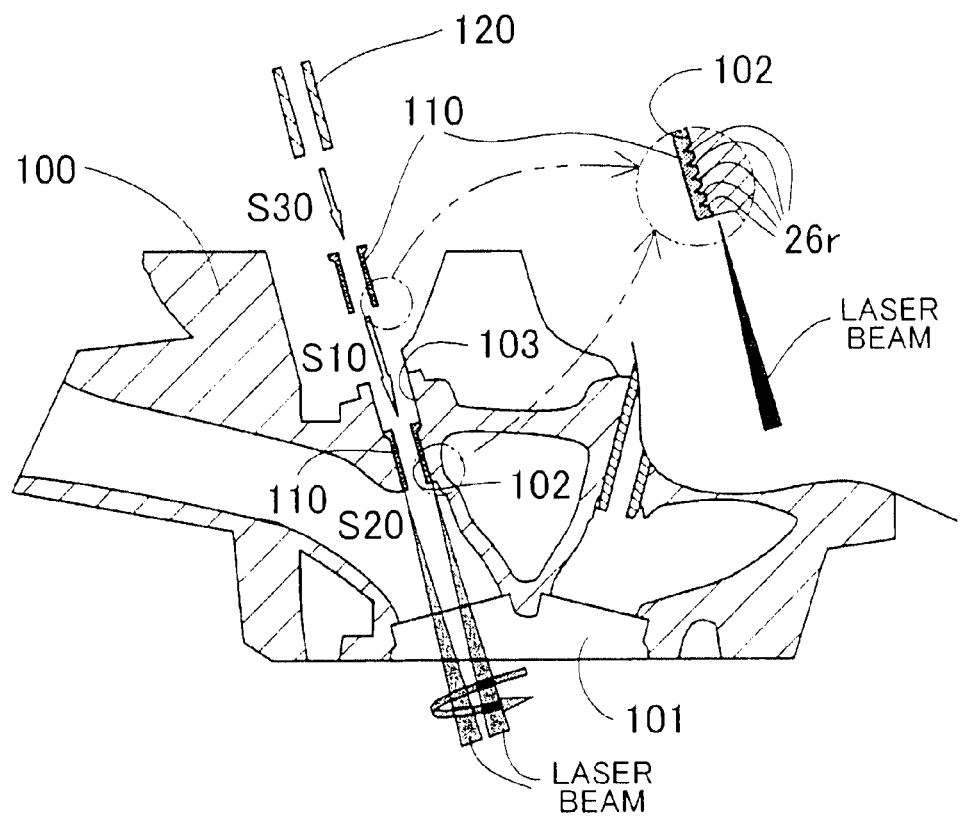
FIG. 9 is a view that shows an alternative embodiment in which a stem guide is laser-welded to a cylinder head.
Figure 9:
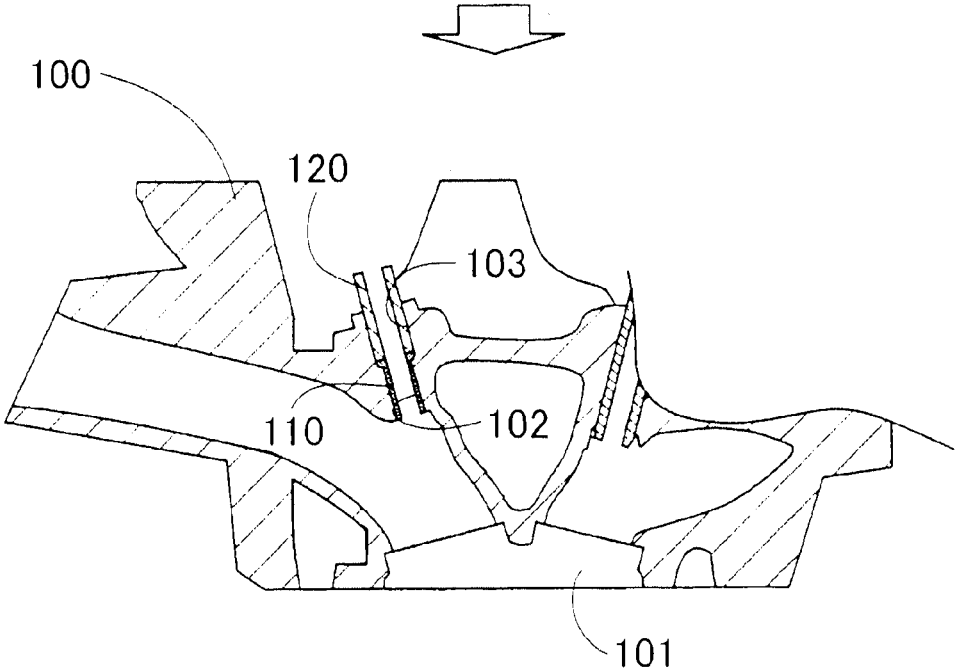

Next, an alternative embodiment in which the above-described laser welding method according to the embodiment is applied to laser welding in another mechanical component will be described. FIG. 9 is a view that illustrates the alternative embodiment in which a stem guide 110 is laser-welded to a cylinder head 100.

As shown in the drawing, the cylinder head 100 includes a first through-hole 102 and a second through-hole 103 above a combustion chamber 101. The stem guide 110 is fitted to the first through-hole 102. The stem guide 110 has a flange portion formed in correspondence with a tapered face at the upper end of the first through-hole 102. An outer guide 120 is fitted to the second through-hole 103. The stem guide 110 and the outer guide 120 are guide members that guide a shaft of an inlet valve (not shown). The stem guide 110 is made of a copper alloy having an abrasion resistance, and is laser-welded to the aluminum die-cast cylinder head 100 as in the case of the above-described cylinder block 10.

In the alternative embodiment, the stem guide 110 has a plurality of annular recesses 26r in streaks at its distal end side of the outer periphery. That is, in advance of laser welding, the annular recesses 26r corresponding to the recesses 26 in each of the above-described lid members 20 are formed in advance on the stem guide 110, and then the stem guide 110 is fitted to the first through-hole 102 (step S10). By so doing, it is possible to visually recognize the inner peripheral wall face of the first through-hole 102, which is a connected portion at which the stem guide 110 is connected to the cylinder head 100, from the side of the combustion chamber 101, so the laser beam is irradiated to the inner peripheral wall face and the laser beam is scanned around the inner peripheral wall face of the first through-hole 102 (step S20). Subsequently, the outer guide 120 is fitted to the second through-hole 103 (step S30).

At the time of carrying out laser welding in step S20, the recesses 26r of the stem guide 110, as well as the recesses 26 in each lid member 20, are closed by the inner peripheral wall face of the first through-hole 102. Thus, the insides of the recesses 26r form cavities, and are interspersed at a constant pitch in the direction in which the laser beam travels as regions having a small absorption of the laser beam. Therefore, the recesses 26r of the stem guide 110 also increase the reaching depth of the laser beam and increase the laser welding depth, so it is possible to laser-weld the stem guide 110 made of a copper alloy to the first through-hole 102 of the cylinder head 100 at a large welding depth.

Figure 10:
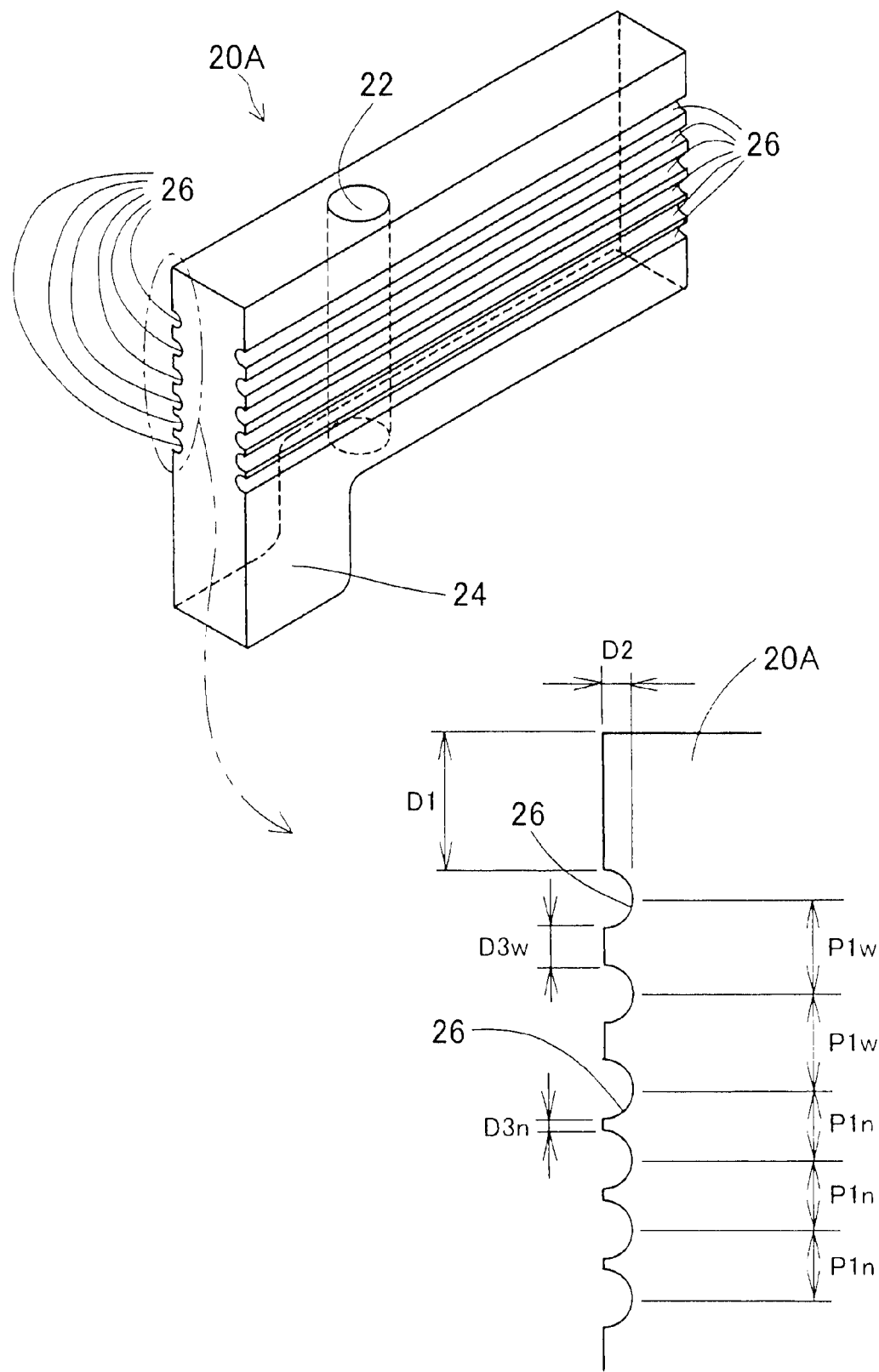
FIG. 10 is a schematic perspective view of a lid member according to another alternative embodiment and an enlarged view of a relevant portion of the lid member.

FIG. 10 is a schematic perspective view of each lid member 20A according to another alternative embodiment and an enlarged view of a relevant portion of each lid member 20A. As shown in the drawing, the lid member 20A is common to the above-described lid member 20 in that the plurality of recesses 26 are provided; however, the lid member 20A differs from the lid member 20 in a pitch at which the recesses 26 are formed. That is, as is apparent from the enlarged view of FIG. 10, the lid member 20A according to the alternative embodiment is formed such that the first recess 26 at the distance D1 from the upper end of the lid member 20A to the third recess 26 have a wide inter-recess size D3w, the fourth and following recesses 26 have a narrow inter-recess size D3n, and, in addition, the recess pitch P1 is also set to a wide recess pitch P1w and a narrow recess pitch P1n. By so doing, the lid member 20A has a narrower interval (inter-recess size D3) of the recesses 26 as the reaching depth of the laser beam increases. Generally, the energy of the laser beam attenuates as the reaching depth increases. However, in the above-described lid member 20A, the inter-recess size D3 of the recesses 26 reduces from the inter-recess size D3w to the inter-recess size D3n as the reaching depth increases, so the laser beam increases its reaching depth when melting is caused over a narrow range of the portion at the groove wall face of the opening-side groove portion 15 connected to a portion having the narrow inter-recess size D3n. Thus, with the cylinder block 10 that forms the inter-bore flow passage 14 using the lid member 20A according to the above-described alternative embodiment or the laser welding method that uses the lid member 20A, it is possible to increase the welding strength of the lid member 20A by increasing the laser welding depth.

The embodiment of the invention is described above; however, the invention is not limited to the above-described embodiment. The invention may be implemented in various forms without departing from the scope of the invention. For example, each recess 26 may have not only a semispherical cross-sectional shape as shown in FIG. 3, and the like, but also a V-shaped cross-sectional shape or a rectangular cross-sectional shape. Other than that, it may be configured as follows.

In the above-described embodiment, each lid member 20 made of copper is laser-welded to the aluminum die-cast cylinder block 10, so melting occurs at a side of the portion of the groove wall face of the cylinder block 10, and does not occur in each lid member 20 so much. Therefore, in the above-described embodiment, the recess depth D2 of each recess 26 that is mostly filled with molten material is set to about 0.2 mm. At the time of laser-welding of two members made of aluminum or an aluminum-based alloy, melting occurs in the two members, so the recess depth D2 may be set to about 0.2 to 0.8 mm. This also applies to a case where members made of copper are laser-welded to each other.

In the present embodiment, each lid member 20 has the protruding portion 24. Instead, each lid member 20 may not have the protruding portion 24.

In the present embodiment, the recesses 26 are formed in each lid member 20. Instead, the recesses 26 may be formed on side walls of each opening-side groove portion 15 of the cylinder block 10. Depending on members that are objects to be connected and laser-welded, the recesses 26 may be formed at both members to be connected. Other than that, it is possible to intersperse portions having a small absorption of the laser beam with the use of so-called double molding of two types of different metal materials or two materials of a metal material and a resin, having different absorptions of the laser beam.

The invention claimed is:

1. A laser welding method for welding a first member and a second member to each other with the use of a laser beam, comprising:
   subjecting at least one of the first and second members to a pre-irradiation process in preparation for irradiation of the laser beam and then connecting the first and second members to each other in order to carry out welding with the use of the laser beam; and
   causing laser beam irradiated members to melt by irradiating the laser beam to connected portions of both the first and second members, and welding both the first and second members to each other through the melting, wherein
   in the pre-irradiation process, a plurality of small absorption portions, which have a smaller absorption of the laser beam than both the first and second members, are formed at the connected portion of at least one of the first and second members at an interval in a direction in which the irradiated laser beam travels, and
   in the pre-irradiation process, recesses that respectively serve as the small absorption portions are formed at the connected portion of the first member and/or the connected portion of the second member, which are objects at which the small absorption portions are formed, intermittently in the direction in which the irradiated laser beam travels.

2. The laser welding method according to claim 1, wherein
   in the pre-irradiation process, the small absorption portions are formed at equal intervals in the direction in which the irradiated laser beam travels.

3. The laser welding method according to claim 1, wherein
   in the pre-irradiation process, the small absorption portions are formed by narrowing a portion between the adjacent small absorption portions as a reaching depth of the laser beam increases.

4. The laser welding method according to claim 1, wherein
   when both the first and second members are welded to each other by irradiating the laser beam, laser beam scanning irradiation in which the laser beam is irradiated while a location to which the laser beam is irradiated is changed along the connected portions is carried out, and
   in the pre-irradiation process, each of the plurality of small absorption portions arranged in the direction in which the irradiated laser beam travels is formed so as to extend over a scanning range of the laser beam scanning irradiation.

5. The laser welding method according to claim 1, wherein
   the first and second members are formed of different metal members or the same metal members.

6. The laser welding method according to claim 5, wherein
   the first and second members are formed of the different metal members having different tendencies to melt for the laser beam, then the first member is formed of a metal member having a property such that the metal member has a less tendency to melt than that of the second member, and the small absorption portions are formed at the first member.

7. The laser welding method according to claim 1, wherein
at least one of the first and second members is formed of a die casting.

8. An engine cooling structure in which a cylinder block includes a plurality of bores and adjacent bores are cooled by refrigerant that passes through an inter-bore flow passage, comprising:
a groove portion that is formed on the cylinder block and is located between the adjacent bores; and
a lid member that is fitted to the groove portion to close an opening side of the groove portion, that forms the inter-bore flow passage together with the groove portion and that is laser-welded to a wall face of the groove portion with the use of an irradiated laser beam, wherein
the lid member has a through-hole that extends through toward a side adjacent to a bottom portion of the inter-bore flow passage and a protruding portion that protrudes toward the side adjacent to the bottom portion of the inter-bore flow passage and that facilitates refrigerant, passing through the inter-bore flow passage, to pass through the through-hole, and
in a pre-irradiation stage, the lid member has a plurality of recesses at a connected portion that is connected to the wall face of the groove portion at an interval in a direction in which the irradiated laser beam travels.

9. The engine cooling structure according to claim 8, wherein
the lid member is laser-welded to the wall face of the groove portion by receiving laser beam scanning irradiation in which the laser beam is irradiated while a location at which the laser beam is irradiated is changed along a closing range in which the lid member closes the opening side of the groove portion, and
in a pre-irradiation stage, the lid member has the plurality of recesses that are arranged in the direction in which the irradiated laser beam travels and that are extended over a scanning range of the laser beam scanning irradiation.

10. The engine cooling structure according to claim 8, wherein the lid member has the protruding portion at an end portion downstream of the refrigerant passing through the inter-bore flow passage.

11. The engine cooling structure according to claim 8, wherein the cylinder block is formed of a die casting.

12. A manufacturing method for an engine that includes an engine cooling structure in which a cylinder block includes a plurality of bores and the adjacent bores are cooled by refrigerant that passes through an inter-bore flow passage, comprising:
forming a closed-end groove portion between the adjacent bores in the cylinder block;
preparing a lid member that is fitted to the groove portion to close an opening side of the groove portion and that forms the inter-bore flow passage together with the groove portion;
forming a plurality of recesses on a lid member-side connected face, at which the prepared lid member is connected to a wall face of the groove portion, at an interval over a range from an upper end of the lid member to a lower end of the lid member;
connecting the wall face of the groove portion to the lid member-side connected face of the lid member by fitting the lid member, on which the plurality of recesses are formed, to the groove portion;
melting a portion of the wall face of the groove portion of the cylinder block by irradiating a laser beam to connected portions at which the wall face of the groove portion is connected to the lid member-side connected face of the lid member in a direction in which the plurality of recesses formed at an interval are arranged; and
welding the lid member to the wall face of the groove portion of the cylinder block through the melting.

13. The manufacturing method according to claim 12, wherein
at the time of irradiating the laser beam to the connected portions at which the wall face of the groove portion is connected to the lid member-side connected face of the lid member, laser beam scanning irradiation in which the laser beam is irradiated while a location at which the laser beam is irradiated is changed along the connected portions is carried out.

14. The manufacturing method according to claim 12, further comprising:
preparing the cylinder block as a die casting.

* * * * *